(12) United States Patent
Kanatsu

(10) Patent No.: US 6,381,368 B1
(45) Date of Patent: Apr. 30, 2002

(54) IMAGE PROCESSING APPARATUS AND METHOD

(75) Inventor: Tomotoshi Kanatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,511

(22) Filed: Dec. 1, 1998

(30) Foreign Application Priority Data

Dec. 3, 1997 (JP) .............................................. 9-333321

(51) Int. Cl.$^7$ .............................. G06K 9/36; G06K 9/46; H03M 7/34; H04N 1/41; H04B 1/66
(52) U.S. Cl. ..................... 382/233; 382/190; 382/232; 382/235; 382/239; 382/243; 341/51; 358/426; 358/430; 375/240; 375/240.02
(58) Field of Search ................................. 382/181, 190, 382/232, 243, 246, 251, 233, 235, 238, 239; 358/403, 405, 426, 430; 341/50, 51; 375/240, 240.02; 348/384.1

(56) References Cited

U.S. PATENT DOCUMENTS

| | | | | |
|---|---|---|---|---|
| 4,730,348 A | * | 3/1988 | MacCrisken | 375/240 |
| 4,929,946 A | * | 5/1990 | O'Brien et al. | 341/87 |
| 4,959,870 A | * | 9/1990 | Tachikawa | 382/253 |
| 5,303,313 A | * | 4/1994 | Mark et al. | 382/235 |
| 5,467,087 A | * | 11/1995 | Chu | 341/51 |
| 5,519,786 A | * | 5/1996 | Courtney et al. | 382/159 |
| 5,553,160 A | * | 9/1996 | Dawson | 382/166 |

* cited by examiner

Primary Examiner—Leo Boudreau
Assistant Examiner—Daniel G. Mariam
(74) Attorney, Agent, or Firm—Fitzpatrick, Cella, Harper & Scinto

(57) ABSTRACT

When a region obtained by predetermined region division processing is a character image, the image is converted at one of predetermined compression ratios (S505). Data in a certain information amount that the region has as pixel data after image conversion is subjected to character recognition, and the degree of similarity (score) to character types registered in advance is calculated (S506). If the calculated score is equal to or smaller than a predetermined threshold value, the information amount is smaller than a minimum information amount necessary for reconstruction of the character image contained in the region. The character image is converted at a compression ratio lower than that in S505 by one step (S507–S509).

12 Claims, 8 Drawing Sheets

FIG.6

| IMAGE SIZE<br>READ RESOLUTION<br>NUMBER OF REGIONS | |
|---|---|
| REGION #1 | POSITION INFORMATION<br>ATTRIBUTE INFORMATION |
| | PIXEL DATA |
| REGION #2 | POSITION INFORMATION<br>ATTRIBUTE INFORMATION |
| | PIXEL DATA |

⋮

| REGION #9 | POSITION INFORMATION<br>ATTRIBUTE INFORMATION |
|---|---|
| | PIXEL DATA |

RESULT OF REGION DIVISION

ORIGINAL IMAGE

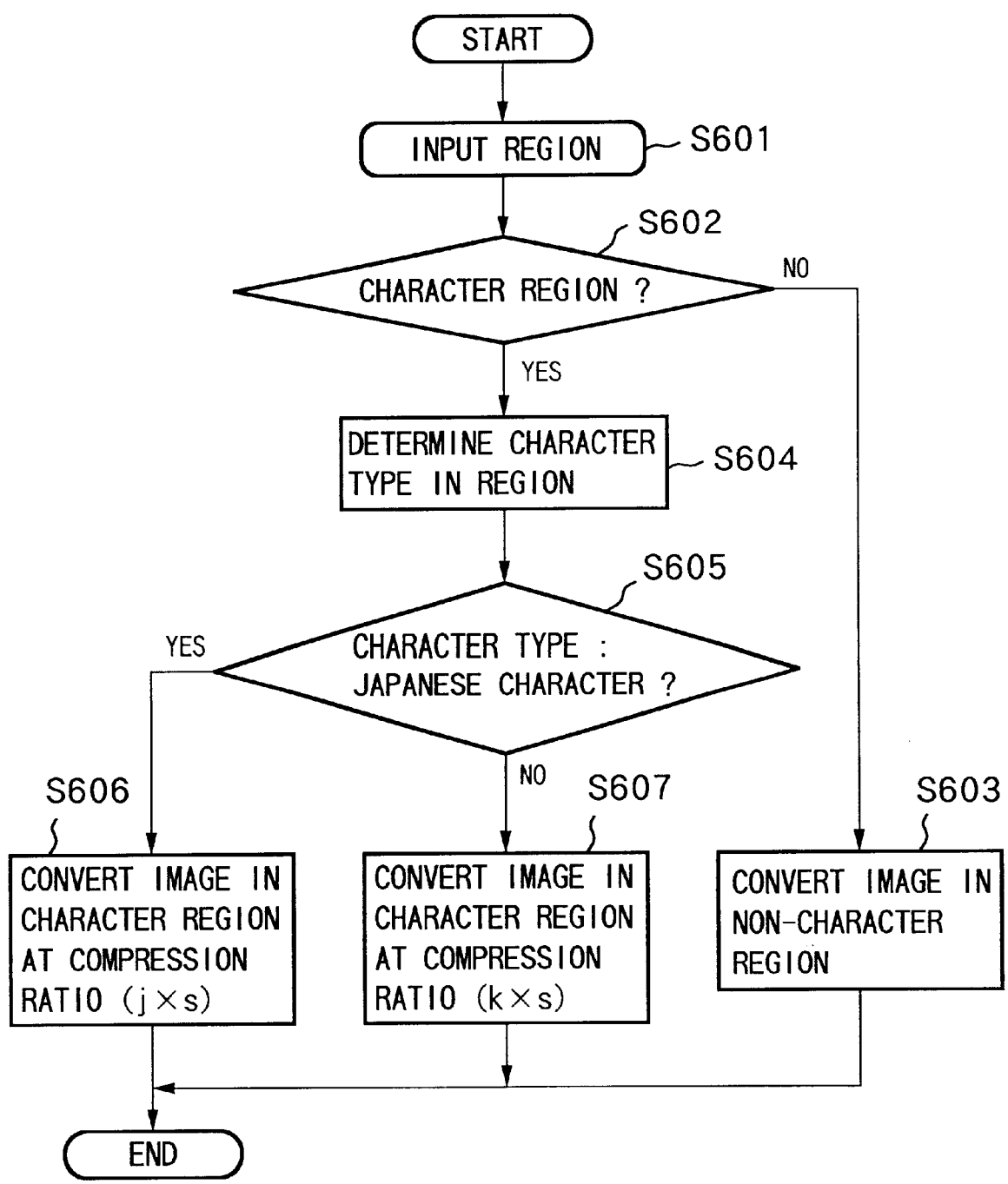

IMAGE PROCESSING APPARATUS AND METHOD

BACKGROUND OF THE INVENTION

The present invention relates to an image processing apparatus and method of transmitting, e.g., input image data to an external device.

Conventionally, transmission of image data of an original (original image) such as a document read by, e.g., an image scanner to an external device via a communication network is generally performed. In this case, since the data transfer capacity of the communication network is limited, the size of data to be transmitted is preferably as small as possible. In recent years, allowing some loss of data received by the receiving-side device in advance, the resolution of image data to be transmitted is reduced before it is transmitted from the transmitting-side device, or irreversible image compression with a high compression efficiency is performed.

In such a case, however, if the image data to be transmitted contains image data of a character region, the loss of transmitted image data must be suppressed to recognize the data as characters in the image data reconstructed as an image on the receiving-side device.

To make the size of data to be transmitted as small as possible, ideally, it is preferable to accurately recognize all characters contained in the original and code them in character recognition by the transmitting-side device. In fact, it is difficult to perform character recognition for all objects to be recognized at the same level as the human recognition performance. Therefore, to prevent information omission or erroneous information transmission due to character recognition errors, the character portion must sometimes be transmitted as pixel data before coding.

For image data representing a drawing, graphic, or photograph other than characters, an image compression technique unsuitable for a character region is sometimes preferably employed when highly accurate information transmission is not required, or inversely, highly accurate reproducibility is particularly required for the drawing or photograph region.

Under this condition, image data having a small size on the communication network and capable of obtaining a satisfactory reconstructed image in the receiving-side device can be generated by dividing the original image into a character region and a non-character region and compressing the images by different methods in units of regions rather than by uniformly compressing the entire original image by a single image compression method.

From the above-described viewpoint, pixel data of a character region to be transmitted through a communication network is regarded as minimum information necessary for constructing (reconstructing) the data to an image that the user can recognize on the receiving-side device. When image compression is performed to delete information except the minimum necessary information on the transmitting-side device, data with the highest transmission efficiency can be generated.

However, the above-described conventional image processing apparatus has the following problem. Since reversible image compression without any information loss is performed for a character region, information which will be consequently wasted may be transmitted to the receiving-side device. Alternatively, when image compression such as resolution conversion with an information loss is performed for a character region, necessary information of a small character may be omitted, or conversely, unnecessary information of a large character may be transmitted in the user-recognizable character image reconstructed by the receiving-side device because the compression ratio is fixed.

To avoid this problem, image compression must be performed using different compression ratios in units of character regions contained in the original. However, when documents of various types or a quantity of documents are to be processed, it is impractical for the user to sequentially determine and change the compression ratio in units of document regions in the transmitting-side device. Hence, to efficiently transmit document information from the transmitting-side device, it is necessary to automatically select image conversion with an optimum compression ratio for each character region contained in the original on the basis of a concept that minimum necessary data that the user can recognize in the receiving-side device need be transmitted.

SUMMARY OF THE INVENTION

It is an object of the present invention to provide an image processing apparatus and method of transmitting pixel data representing a character image and having a minimum necessary size for reconstruction by an external device.

In order to achieve the above object, an image processing apparatus of the present invention has the following arrangement.

An image processing apparatus comprises compression means for compressing pixel data of a character image block at one of a plurality of predetermined compression ratios, character recognition means for performing character recognition for pixel data obtained by the compression means, compression ratio selection means for selecting one of the plurality of predetermined compression ratios on the basis of a recognition result from the character recognition means, and transmission means for transmitting, to an external device, pixel data obtained by compressing the pixel data of the character image block by the compression means at the compression ratio selected by the compression ratio selection means.

The character recognition means compares a feature vector represented by the pixel data of the character image block with each of feature vectors of a plurality of character types stored in advance and selects a character type having the highest degree of similarity in comparison as the recognition result.

The compression ratio selection means selects one of the plurality of predetermined compression ratios on the basis of a result of comparison between a value representing the degree of similarity obtained by the character recognition means and a predetermined threshold value.

The predetermined threshold value represents a minimum state wherein when an image represented by the pixel data of the character image block is reconstructed by the external device on the basis of the pixel data transmitted by the transmission means, the image can be recognized as a character.

When a plurality of character image blocks are present, the compression ratio selection means selects one of the plurality of predetermined compression ratios in units of character image blocks.

In order to achieve the above objects, an image processing method of the present invention has the following steps.

An image processing method comprises the compression step of compressing pixel data of a character image block at one of a plurality of predetermined compression ratios, the character recognition step of performing character recognition for pixel data obtained by data compression, the compression ratio selection step of selecting one of the plurality of predetermined compression ratios on the basis of a recognition result, and the transmission step of transmitting, to an external device, pixel data obtained by compressing the pixel data of the character image block at the selected compression ratio.

The character recognition step comprises comparing a feature vector represented by the pixel data of the character image block with each of feature vectors of a plurality of character types stored in advance and selecting a character type having the highest degree of similarity in comparison as the recognition result.

The compression ratio selection step comprises selecting one of the plurality of predetermined compression ratios on the basis of a result of comparison between a value representing the degree of similarity obtained in the character recognition step and a predetermined threshold value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an example of a data format of document information in the first embodiment of the present invention;

FIG. 8 is a flow chart showing image conversion processing in the second embodiment of the present invention.

DETAILED DESCRIPTION OF THE PREFERRED EMBODIMENTS

An embodiment in which an image processing apparatus of the present invention is applied to a computer will be described below with reference to the accompanying drawings.

First Embodiment

The arrangement of an image transmission system of this embodiment will be described first with reference to FIG. 1.

Figure 1:
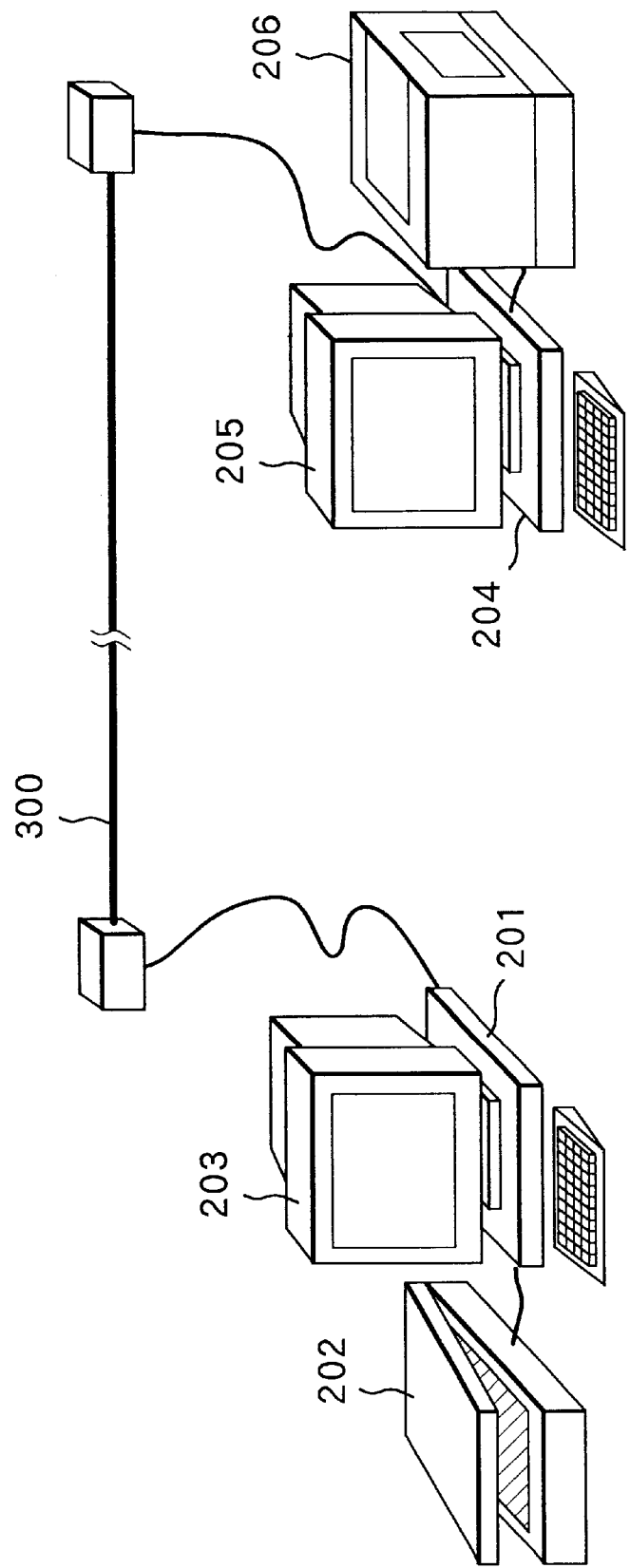
FIG. 1 is a view showing the schematic arrangement of an image transmission system according to the first embodiment of the present invention.

FIG. 1 is a view showing the schematic arrangement of the image transmission system of the first embodiment of the present invention.

Referring to FIG. 1, a transmitting-side host 201 (to be referred to as a host 201 hereinafter) and a receiving-side host 204 (to be referred to as a host 204 hereinafter) are connected via a communication network 300 to communicate with each other.

The operation of the image transmission system of this embodiment will be briefly described with reference to FIG. 1. A scanner 202 for optically reading an original such as a document is connected to the host 201. Image data input from the scanner 202 to the host 201 can be subjected to predetermined processing to be described later and transmitted to the host 204 through the communication network 300. The host 204 can display the contents of image data received from the host 201 on a display 205 or print the image data by a printer 206.

Figure 2:
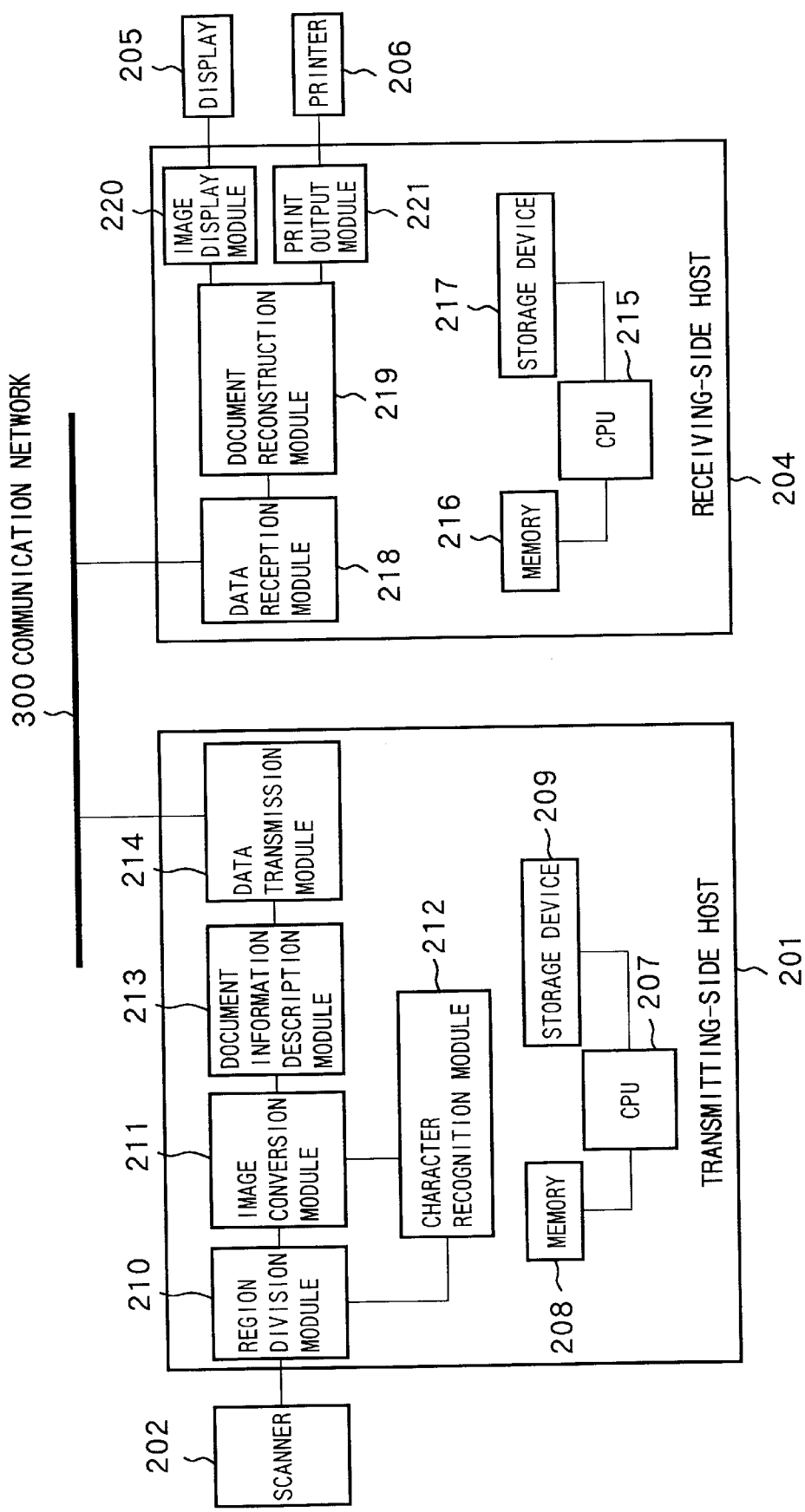
FIG. 2 is a block diagram for explaining the apparatus arrangement of transmitting- and receiving-side hosts of the first embodiment of the present invention.

FIG. 2 is a block diagram for explaining the apparatus arrangement of the transmitting- and receiving-side hosts of the first embodiment.

Referring to FIG. 2, the transmitting-side host 201 has a CPU 207, memory 208, and storage device 209 as main units. The CPU 207 performs predetermined data processing and data input/output processing to be described later in accordance with a program stored in the storage device 209 in advance. Blocks 210 to 214 are functional modules of the program executed by the CPU 207 of the transmitting-side host 201.

The receiving-side host 204 has a CPU 215, memory 216, and storage device 217 as main units. The CPU 215 performs predetermined data processing and data input/output processing to be described later in accordance with a program stored in the storage device 217 in advance. Blocks 218 to 221 are functional modules of the program executed by the CPU 215 of the receiving-side host 204.

The communication network 300 is a transmission line for transmitting data from the transmitting-side host 201 to the receiving-side host 204. Original image data output from the scanner 202 is divided into regions (blocks) by a region division module 210. "Position information", "attribute information", and "pixel data" are generated in units of regions (region division will be described later).

When the "attribute information" of a region generated by the region division module 210 represents "character", a character recognition module 212 performs predetermined character recognition processing for the "pixel data" of the region to generate the text code of the characters represented by the "pixel data" of the region (character recognition will be described later).

An image conversion module 211 compresses the size of "pixel data" of each region generated by the region division module 210. As an image conversion method, one of a plurality of predetermined methods is selected in accordance with the "attribute information" of each region and output data from the character recognition module 212 (image conversion will be described later).

A document information description module 213 generates "document information data", having a predetermined data format on the basis of the "attribute information", "position information", and "compressed pixel data" of each region, which are output from the image conversion module 211.

FIG. 6 is a view showing the data format of document information data in the first embodiment of the present invention. The document information data is described by the document information description module 213.

In the "document information data", shown in FIG. 6, pieces of block information of a plurality of regions (blocks) based on the region division result by the region division module 210 continuously follow the header representing the entire document structure, in which the original size, scanner resolution, and the like are stored. The block information of each region is comprised of "position information", "attribute information" and "compressed pixel data" obtained by image conversion.

A data transmission module 214 converts the data output from the document information description module 213 into a predetermined transmission format and transmits the data to the receiving-side host 204 through the communication network 300.

A reception module 218 of the receiving-side host 204 receives the data from the data transmission module 214 of the transmitting-side host 201 and performs predetermined inversion for the received data, thereby reconstructing document information before conversion to a predetermined format by the data transmission module 214.

A document construction module 219 decodes the "document information data" output from the reception module 218 by a predetermined method to construct it into the original image form.

An image display module 220 displays the image on the display 205 on the basis of the image data output from the document construction module 219.

A print output module 221 prints the image and outputs it from the printer 206 on the basis of the image data output from the document construction module 219.

The flow of data processing in the transmitting-side host 201 will be described next with reference to FIG. 3.

Figure 3:
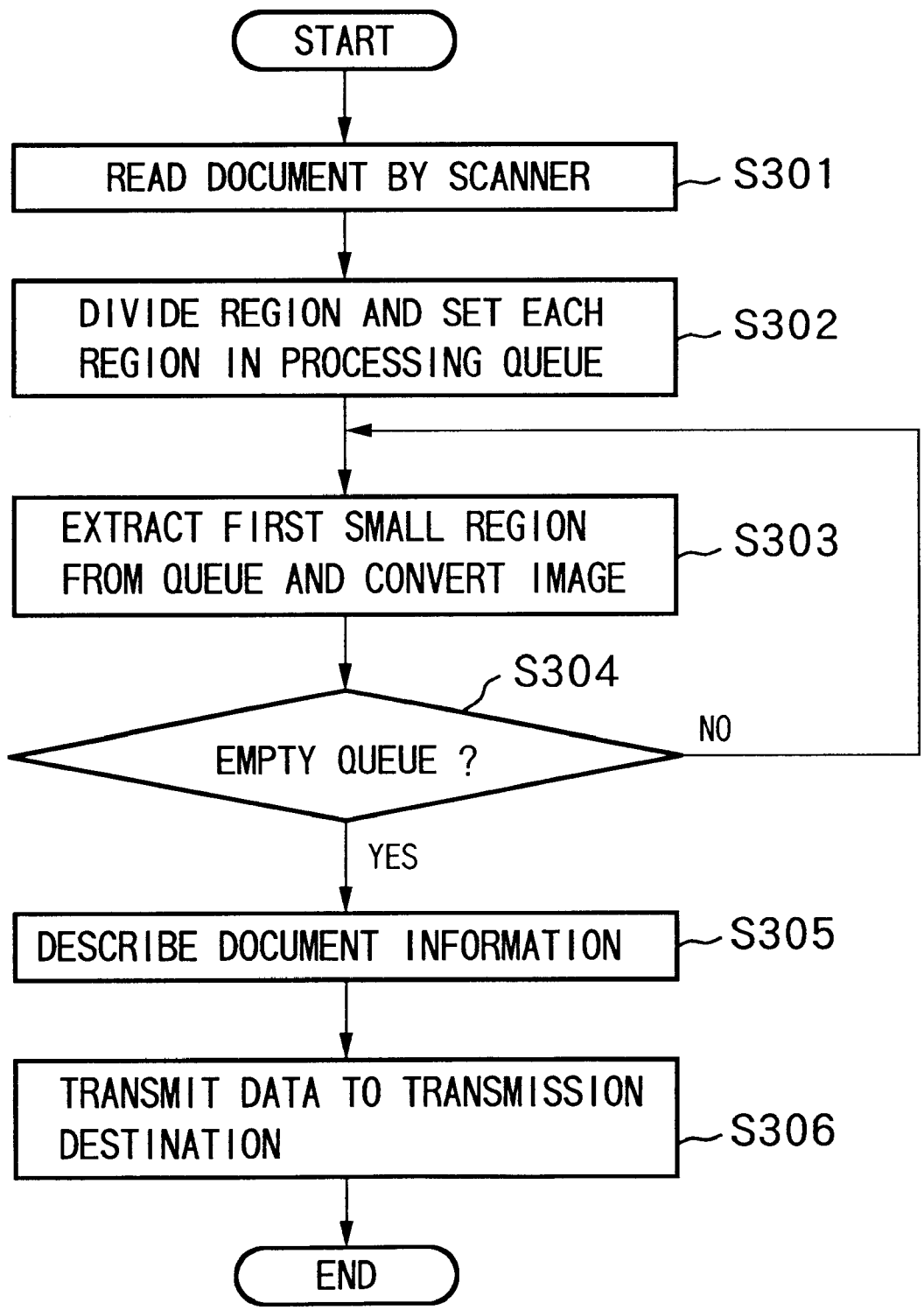
FIG. 3 is a flow chart of processing in the transmitting-side host of the first embodiment of the present invention.

FIG. 3 is a flow chart of processing in the transmitting-side host of the first embodiment of the present invention. FIG. 3 shows the processing procedure of the above-described functional modules 210 to 214, which is performed by the CPU 207.

The transmitting-side host 201 divides the original (document) image data read by the scanner 202 in step S301 into regions by the region division module 210 in step S302. All the divided regions are set in the processing queue.

In step S303, the image conversion module 211 performs predetermined image conversion processing for the pixel data of the first region in the queue on the basis of the "attribute information" of each region and the output from the character recognition module 212, thereby reducing the size of "pixel data" (details will be described later).

In step S304, it is determined whether the queue is not empty because unconverted regions remain in step S303. If NO (the queue is not empty) in step S304, the flow returns to step S303. If the queue is empty (YES in step S304), the flow advances to step S305. The document information description module 213 generates "document information data" on the basis of the "position information", "attribute information", and "compressed pixel data" of each region.

In step S306, the data transmission module 214 transmits the document information data prepared by the document information description module 213 to the host 204.

The flow of data processing in the receiving-side host 204 will be described next with reference to FIG. 4.

Figure 4:
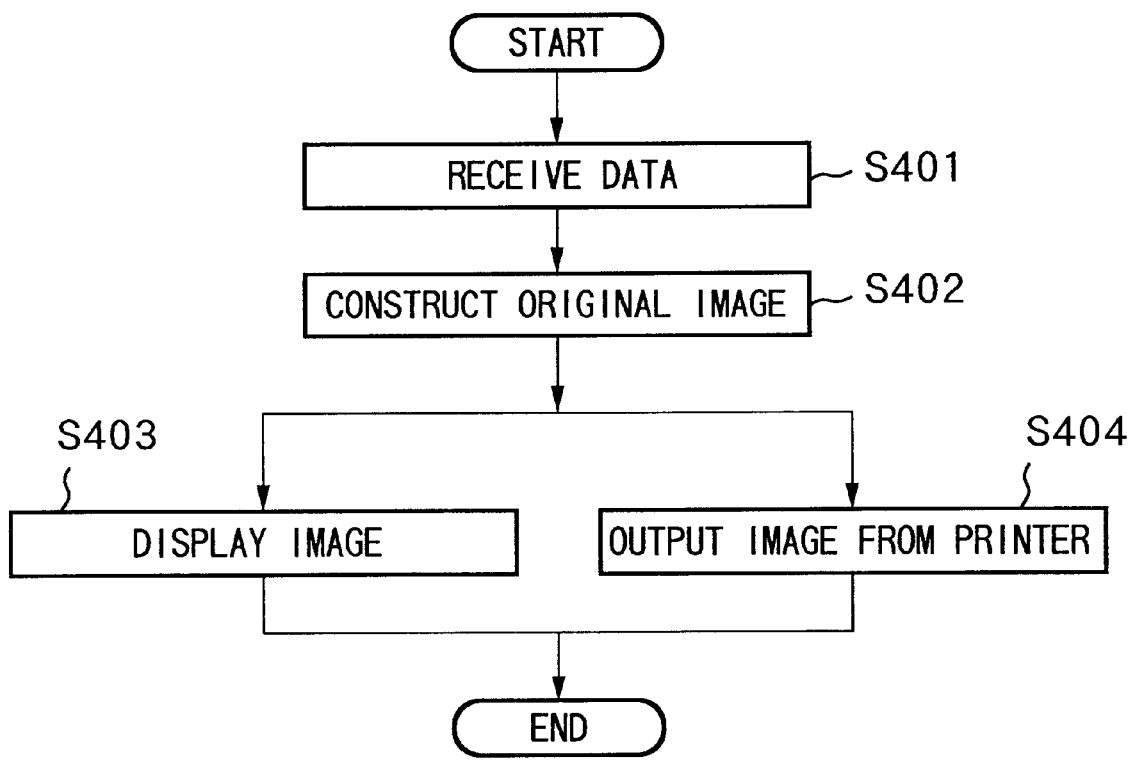
FIG. 4 is a flow chart of processing in the receiving-side host of the first embodiment of the present invention.

FIG. 4 is a flow chart of processing in the receiving-side host of the first embodiment of the present invention. FIG. 4 shows the processing procedure of the above-described functional modules 218 to 221, which is performed by the CPU 215.

The receiving-side host 204 converts the data received from the host 201 in step S401 into "document information data" by the reception module 218, and converts the document information data into the image data in the original image form by the document construction module 219 in step S402.

In step S403, the image is displayed on the display 205 on the basis of the image data constructed in step S402. In step S404, the image is printed and output from the printer 206 on the basis of the image data constructed in step S402.

Region division processing performed by the region division module 210, character recognition processing performed by the character recognition module 212, and image conversion processing performed by the image conversion module 211 will be described next.

<Region Division Processing>

Figure 7B:
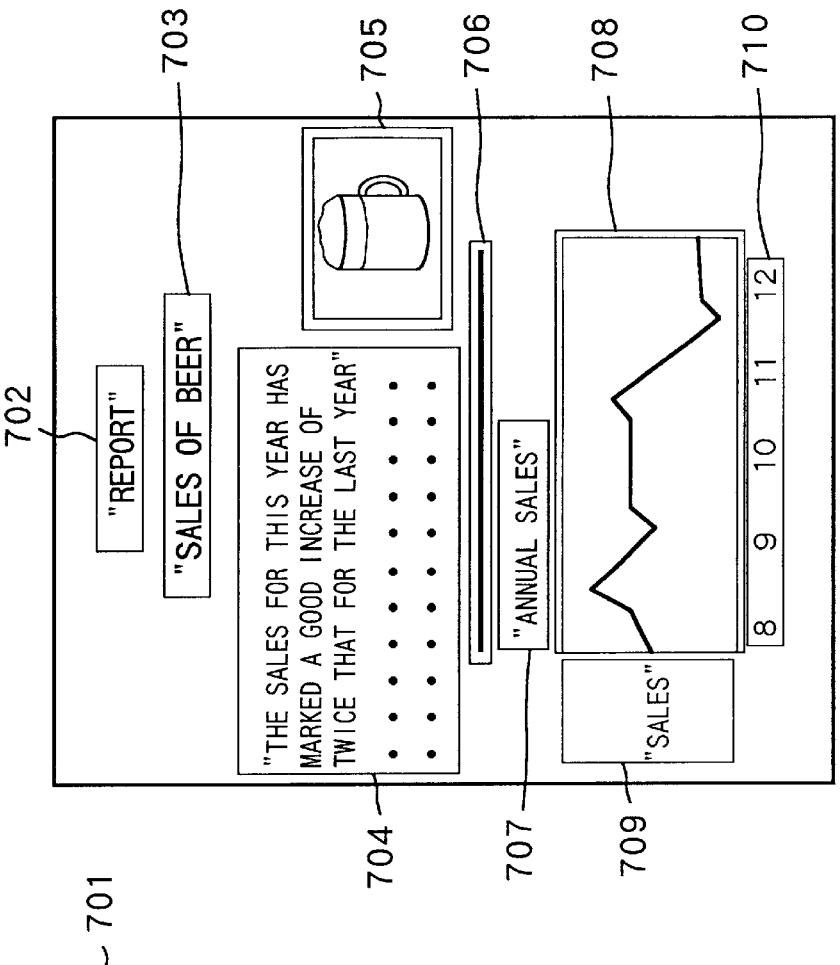
FIGS. 7A and 7B are views for explaining region division processing in the first embodiment of the present invention.
Figure 7A:
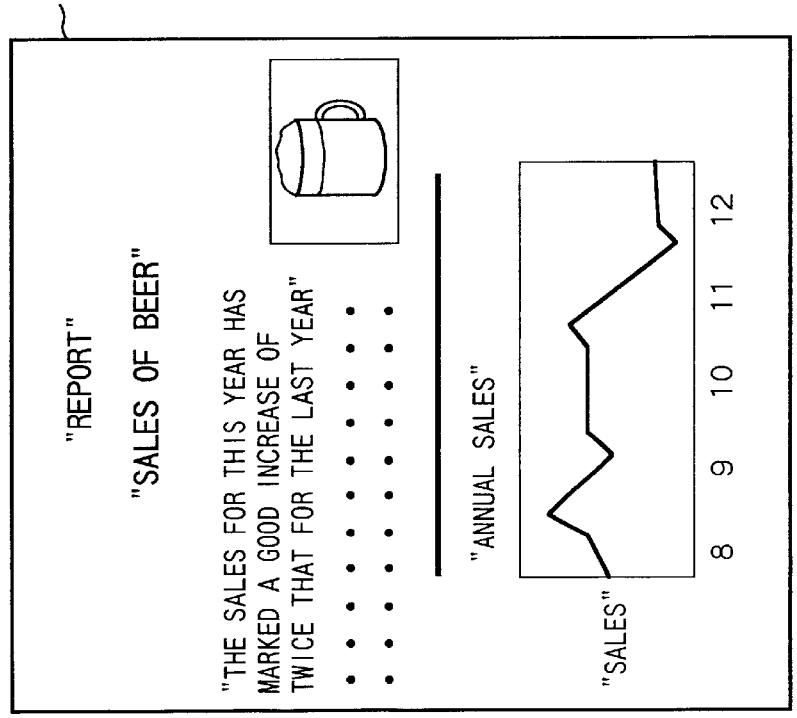

FIGS. 7A and 7B are views for explaining region division processing in the first embodiment of the present invention.

An original image 701 shown in FIG. 7A is divided into character regions 702, 703, 704, 707, 709, and 710, drawing/photograph regions 705 and 708, and a line region 706 by region division processing. Block information having a predetermined data format containing "position information" representing the range of the region, "attribute information" representing the type of image, and "pixel data" of the region is generated on the basis of the image data of each divided region.

The region division module 210 divides the entire original image into a plurality of regions having different attributes such as a character region, a drawing/photograph region, and a line region. In this division processing, the pixel data of the original is scanned, and the attribute is determined depending on whether black pixels in each region satisfy a predetermined condition. As this condition, mainly (1) amount of edge (contour) of black pixels, or
(2) set of consecutive blocks consisting of black pixels having a predetermined width is used. Currently, this is general processing, and a detailed description thereof will be omitted.

<Character Recognition Processing>

The character recognition module 212 employs, as an example of character recognition, a character recognition method using extraction of feature vectors contained in an image to be processed and matching of feature vectors. More specifically, the transmitting-side host 201 has, in the storage device 209, images of all character types to be subjected to character recognition as a dictionary of feature vectors. When an image as a character to be recognized is input, comparison between the feature vector of the image and the vector of each character type in the dictionary is performed on the basis of the degree of similarity between the vectors. A character type which has the most similar vector in the dictionary is determined as the input character type to be recognized.

The character recognition module 212 scores the maximum value representing the degree of similarity, which is obtained in comparison processing for the character image to be recognized. If this score is equal to or smaller than a predetermined threshold value, it is determined that the current object to be recognized is a reject character, i.e., a character which is not registered in the dictionary.

<Image Conversion Processing>

The image conversion module 211 determines whether the "attribute information" of an input region represents a character region, on the basis of the block information of the region. If the region is a non-character region, predetermined image conversion processing for a non-character region is uniformly performed for the entire region. The image conversion method for a non-character region will be described. For example, a natural image region is compressed using so-called JPEG (Joint Photographic Experts Group).

For a character region, image conversion processing for a character region is performed at an optimum image compression ratio for the character region to be converted.

As the image conversion technique for a character region, resolution conversion as one of image conversion techniques, i.e., simple reduction conversion for uniformly thinning pixels representing the image of a certain region to reduce the number of pixels is employed. Any other image compression method can be employed to change the compression ratio and parameters associated with the loss of "image data".

Optimum compression ratio estimation processing in image conversion will be described next.

As described above, the character recognition module 212 scores the maximum value representing the degree of similarity, which is obtained for a character image contained in the region to be recognized, and determines, on the basis of the score, whether the current object to be recognized is a reject character. The image conversion module 211 uses this determination result to obtain a compression limit for the pixel data of the character region in accordance with the following procedure.

First, a character image in a region as a current object is converted at a certain compression ratio. The character recognition module 212 performs character recognition processing for pixel data in a certain information amount that the character image has as pixel data after image conversion. If the score of the character represented by the pixel data after image conversion is equal to or smaller than a predetermined threshold value, it means that the character represented by the pixel data cannot be recognized by the user when the image is reconstructed by the receiving-side host 204. That is, the information amount is smaller than the minimum information amount necessary for image reconstruction. Conversely, if the score is larger than the predetermined threshold value, the character can be recognized by the user, i.e., the minimum information amount necessary for image reconstruction is ensured.

This determination is done first at a low compression ratio and repeated while gradually increasing the compression ratio. A compression ratio obtained immediately before the score becomes smaller than the predetermined threshold value is determined as the compression ratio limit for the character image region, i.e., the optimum compression ratio.

In this optimum compression ratio estimation processing, a reliable compression ratio can be obtained by using a larger number of characters contained in the character image region to be converted.

The flow of optimum compression ratio estimation processing for the character image will be described next with reference to FIG. 5.

Figure 5:
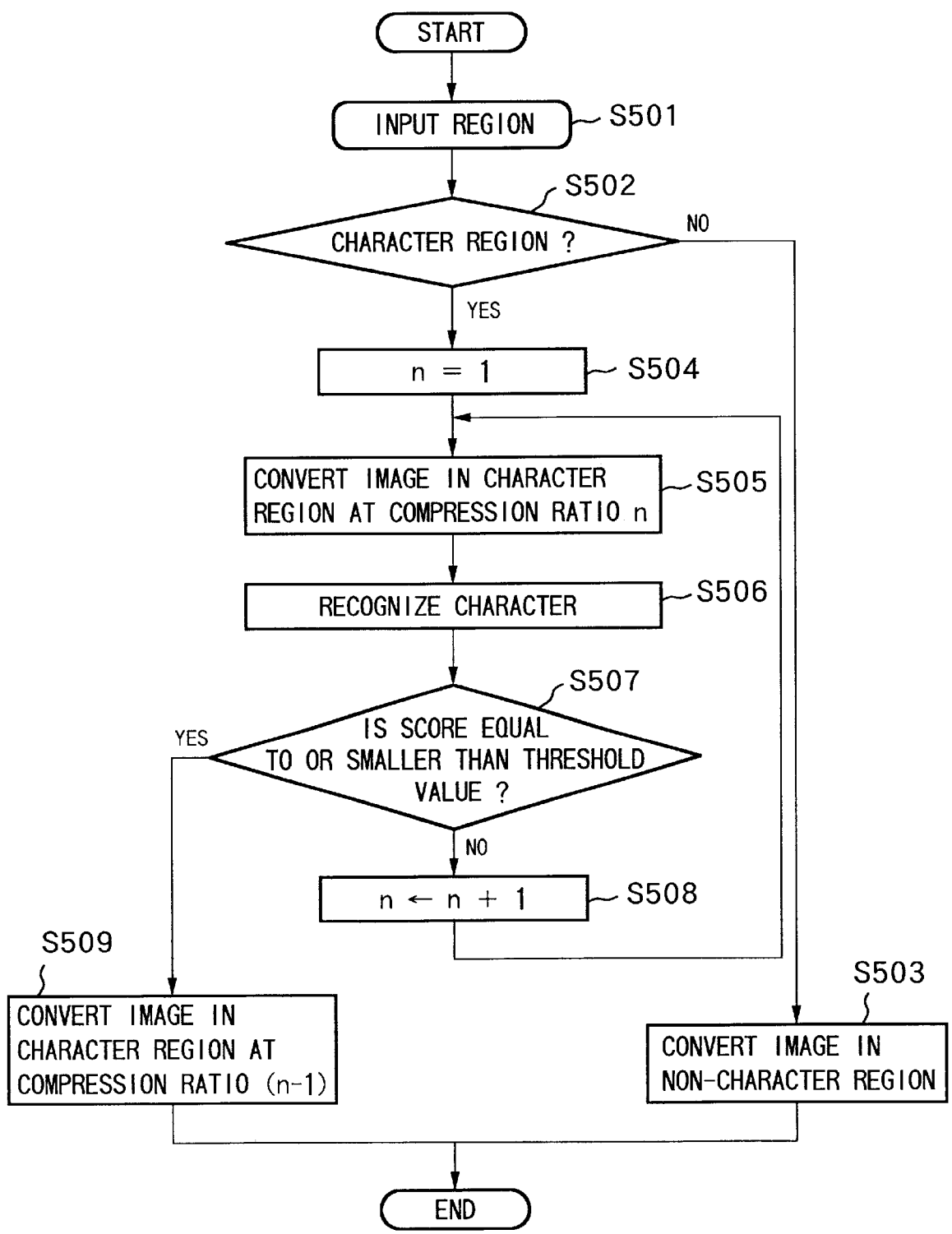
FIG. 5 is a flow chart showing optimum compression ratio estimation processing in the first embodiment of the present invention.

FIG. 5 is a flow chart showing optimum compression ratio estimation processing in the first embodiment of the present invention. FIG. 5 shows the processing procedure of function modules or the image conversion module 211 and the character recognition module 212, which is performed by the CPU 207 for one region output from the region division module 210. Image conversion processing shown in FIG. 5 is performed for each region output from the region division module 210.

In the following processing, the compression ratio is represented by a value n (n is an integer larger than 0) which represents the determined compression ratios stepwise. As the value n sequentially increases from 1, the compression ratio represented by the value n becomes high.

When a region to be processed is input from the region division module 210 (step S501), the image conversion module 211 determines whether the region is a character region or a non-character region, on the basis of the "attribute information" in the block information of the input region (step S502). If it is determined in step S502 that the region is a non-character region, the region division module 210 uniformly performs predetermined non-character region image conversion processing for the entire region in step S503. If it is determined in step S502 that the region is a character region, the flow advances to step S504.

In step S505, image conversion processing for the "pixel data" contained in the region to be processed is performed at the compression ratio represented by the value n. As described above, in this embodiment, simple reduction conversion for uniformly thinning pixels representing the image of a certain region to reduce the number of pixels is employed as the image conversion method, and the value n is used as the parameter of compression ratio. In image conversion for the first time, n =1 is substituted into the value n in step S504.

In image conversion, the original pixel data, i.e., the "pixel data" obtained by reading the original in step S301 in FIG. 3 is stored in the storage device 209. Image conversion for the region is always performed for this original "pixel data".

In step S506, some character images are extracted from the "pixel data" of the region converted in step S505, and the character recognition module 212 recognizes these character images. The score of the degree of similarity of each character image is calculated.

In step S507, scores calculated in step S506 are averaged, and the average value is compared with a predetermined threshold value. The reason why the average value of the scores is calculated is that a reliable compression ratio can be obtained by using a larger number of characters contained in the character image region to be processed.

In step S508, it is determined from comparison in step S507 that the average value of scores is larger than the threshold value, and the compression ratio for image conversion performed in step S505 allows the user to recognize the character image reconstructed by the receiving-side host 204. For this reason, the value n is incremented by one, and the flow returns to step S505 to perform image conversion at a higher compression ratio.

In step S509, it is determined from comparison in step S507 that the average value of scores is smaller than the threshold value, and the current compression ratio does not allow the user to recognize the character image reconstructed by the receiving-side host 204. The value n is decremented by one, and image conversion is performed for the "pixel data"(character image) of the region to be processed at a compression ratio represented by the value n. The converted pixel data is output to the document information description module 213. Note that n=0 means that compression/conversion is not performed.

As described above, in this embodiment, since the data size can be compressed in accordance with the attribute of each region, the data transmission efficiency in the communication network 300 can be improved as compared to a case wherein the entire original image is uniformly compressed and transmitted. For a character image region contained in the original, the minimum information amount necessary for the user to recognize the character image reconstructed by the receiving-side host 204 is automatically calculated in units of character image regions. With this processing, image data having a small size on the communication network 300 and capable of obtaining a satisfactory reconstructed image in the receiving-side device can be generated.

In this embodiment, the receiving- and transmitting-side devices are general-purpose computers, and the above-described processing is realized mainly by software. However, the processing may be realized by hardware.

In addition, the communication network 300 may be not only various wire transmission lines such as a leased line or a public telephone line but also radio channels. Especially, according to the present invention, the transmission efficiency can be largely improved in use of a transmission line such as a general telephone line having a low data transmission rate.

In the above-described embodiment, the optimum compression ratio n is determined, and the image in the character region is converted, thereby generating a plurality of images with different resolutions. However, the method is not limited to this. A plurality of character region images with different resolutions may be prepared in advance using so-called Flash pix data structure. In this case, it is only necessary to select the image with the optimum resolution from the prepared plurality of images with different resolutions which are prepared in advance. Therefore, a time required for arithmetic processing for image conversion can be shortened.

Second Embodiment

In the above-described first embodiment, the degree of compression in image conversion for the character image region by the image conversion module 211 is determined on the basis of the character recognition result from the character recognition module 212. This determination method is not limited to this, and an algorithm for selectively determining the degree of compression using a more specific nature in the character image may be used.

For example, Japanese characters generally include Chinese characters having the same size but complex line patterns. Hence, in many cases, when conversion is performed at a high compression ratio, an image reconstructed on the basis of the compressed data cannot be recognized by the user. To the contrary, English characters have relatively simple structures and can withstand compression at a high compression ratio. That is, the image reconstructed on the basis of the compressed data can be recognized by the user, unlike the Japanese characters.

In the second embodiment, an image processing apparatus having the same arrangement as in the first embodiment and using the above difference in characteristics will be described. For example, Japanese and English characters are determined.

FIG. 8 is a flow chart showing image conversion processing in the second embodiment of the present invention. FIG. 8 shows the processing procedure of functional modules or an image conversion module 211 and a character recognition module 212, which is performed by a CPU 207 for one region output from a region division module 210. Image conversion processing shown in FIG. 8 is performed for each region output from the region division module 210.

In steps S601 and S602, the same processing as in steps S501 and S502 described in the first embodiment is performed. If the region is a non-character region, the flow advances to step S603 to perform the same processing as in step S503.

If it is determined in step S602 that the region is a character region, the characters in the region are determined in step S604. In this embodiment, character determination processing is performed using the output (text code) from the character recognition module 212, thereby determining whether each character is a Japanese or English character.

Particularly in many Japanese documents, both Japanese and English characters are present in one region. In determining the character type, when the output (text code) from the character recognition module 212 contains a Japanese character, i.e., a code other than an alphabet or numeral, the character type is determined as a Japanese character; otherwise, the character type is determined as an English character.

To determine the character type, the recognition result from the character recognition module 212 need not always be used.

If it is determined in step S605 that the character type in the region is of a Japanese character, the character image is converted using a predetermined compression ratio ($j \times s$) in step S606. If the character type is of an English character, image conversion is performed at a compression ratio ($k \times s$) in step S607. In this case, s is a variable proportional to the average value of character sizes obtained from the character image in the region, and j and k are constants of compression ratios which are defined in advance for Japanese and English characters, respectively.

In this embodiment as well, image conversion for each character region is performed in consideration of the nature of the region. For this reason, image data having a small size on a communication network 300 and capable of obtaining a satisfactory reconstructed image in the receiving-side device can be generated.

Other Embodiments

The present invention may be applied to a system constituted by a plurality of devices (e.g., a host computer, an interface device, a reader, a printer, and the like) or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the above-described embodiments, an image processing apparatus and method of transmitting pixel data representing a character image and having a minimum data size necessary for reconstruction by an external device can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   compression means for compressing pixel data of a character image block at one of a plurality of predetermined compression ratios;
   character recognition means for performing character recognition of pixel data obtained by said compression means;
   compression ratio selection means for selecting one of a plurality of predetermined compression ratios based on a predetermined threshold value and recognition result from said character recognition means; and
   transmission means for transmitting, to an external device, pixel data obtained by compressing the pixel data of the character image block by said compression means at the compression ratio selected by said compression ratio selection means,
   wherein the predetermined threshold value represents a minimum compression ratio such that, when an image represented by the pixel data of the character image block is reconstructed by the external device based on the pixel data transmitted by said transmission means, the image can be recognized as a character by a user.

2. The apparatus according to claim 1, wherein said character recognition means compares a feature vector represented by the pixel data of the character image block with each of feature vectors of a plurality of character types stored in advance and selects a character type having a highest degree of similarity in comparison as the recognition result.

3. The apparatus according to claim 2, wherein said compression ratio selection means selects one of the plurality of predetermined compression ratios based on a result of comparison between a value representing a degree of similarity obtained by said character recognition means and the predetermined threshold value.

4. The apparatus according to claim 1, wherein said compression ratio selection means changes the compression ratio in accordance with a character type of the character image block, which is determined through character recognition by said character recognition means.

5. The apparatus according to claim 1, wherein, when a plurality of character image blocks are present, said compression ratio selection means selects one of the plurality of predetermined compression ratios in units of character image blocks.

6. The apparatus according to claim 5, wherein
   said apparatus further comprises region division means for dividing pixel data of an original image into a plurality of image blocks based on an attribute of an image contained in the original image, and
   said compression ratio selection means processes, of the plurality of image blocks divided by said region division means, a character image block whose image attribute represents a character.

7. The apparatus according to claim 1, wherein said compression means uniformly thins pixels representing a character image of the character image block at a predetermined ratio to compress the pixel data.

8. An image processing method comprising:
   a compression step of compressing pixel data of a character image block at one of a plurality of predetermined compression ratios;
   a character recognition step of performing character recognition for pixel data obtained by data compression;
   a compression ratio selection step of selecting one of a plurality of predetermined compression ratios based on a predetermined threshold value and a recognition result; and
   a transmission step of transmitting, to an external device, pixel data obtained by compressing the pixel data of the character image block at the selected compression ratio,
   wherein the predetermined threshold value is set that the threshold value represents a minimum compression ratio such that, when an image represented by the pixel data of the character image block is reconstructed by the external device based on the pixel data transmitted in said transmission step, the image can be recognized as a character by a user.

9. The method according to claim 8, wherein the character recognition step comprises comparing a feature vector represented by the pixel data of the character image block with each of feature vectors of a plurality of character types stored in advance and selecting a character type having a highest degree of similarity in comparison as the recognition result.

10. The method according to claim 9, wherein the compression ratio selection step comprises selecting one of the plurality of predetermined compression ratios based on a result of comparison between a value representing a degree of similarity obtained in the character recognition step and the predetermined threshold value.

11. The method according to claim 8, wherein, when a plurality of character image blocks are present, the compression ratio selection step comprises selecting one of the plurality of predetermined compression ratios in units of character image blocks.

12. A computer-readable recording medium storing a program for transmitting pixel data of an image character block to an external device, the program comprising:
   compression means for compressing the pixel data of the character image block at one of a plurality of predetermined compression ratios;
   character recognition means for performing character recognition for pixel data obtained by said compression means;
   compression ratio selection means for selecting one of a plurality of predetermined compression ratios based on a predetermined threshold value and a recognition result from said character recognition means; and
   transmission means for transmitting, to an external device, pixel data obtained by compressing the pixel data of the character image block by said compression means at the compression ratio selected by said compression ratio selection means,
   wherein the predetermined threshold value represents a minimum compression ratio such that, when an image represented by the pixel data of the character image block is reconstructed by the external device based on the pixel data transmitted by said transmission means, the image can be recognized as a character by a user.

* * * * *